United States Patent
Chao et al.

(10) Patent No.: US 6,831,136 B2
(45) Date of Patent: Dec. 14, 2004

(54) AMINO-TERMINATED POLYBUTADIENES

(75) Inventors: Herbert Chao, Paoli, PA (US); Nan Tian, Wilmington, DE (US); Alain Drexler, Philadelphia, PA (US); John Schmidhauser, Paoli, PA (US)

(73) Assignee: Sartomer Technology Company, Inc., Wilmington (DE)

( * ) Notice: Subject to any disclaimer, the term of this patent is extended or adjusted under 35 U.S.C. 154(b) by 11 days.

(21) Appl. No.: 10/341,864

(22) Filed: Jan. 14, 2003

(65) Prior Publication Data

US 2004/0138380 A1 Jul. 15, 2004

(51) Int. Cl.$^7$ .............................................. C08C 19/22
(52) U.S. Cl. .................... 525/377; 525/331.9; 525/338; 525/333.2
(58) Field of Search ............................. 525/331.9, 333.2, 525/338, 377

(56) References Cited

U.S. PATENT DOCUMENTS

| | | |
|---|---|---|
| 3,316,185 A | 4/1967 | Reinking |
| 4,658,062 A | 4/1987 | Hinney et al. |
| 4,994,621 A * | 2/1991 | Yeakey et al. ............... 564/475 |

OTHER PUBLICATIONS

V. Edward Lindsell and Stephen Tait. Synthesis and Characterization of α, Ω and α–functionalized hydrogenated polbutadienes: telechalic amine and phosphilt terminated polymers.

* cited by examiner

*Primary Examiner*—Roberto Rabago

(57) ABSTRACT

Improved amine-terminated polybutadienes (ATPBs) having one or two terminal amino groups, are prepared by cyanoalkylating a hydroxyl-terminated polybutadiene by Michael addition of acrylonitrile in the presence of a base, forming nitrile termination, followed by hydrogenation in the presence of a Group VIII metal as catalyst. The ATPBs may be hydrogenated or partially hydrogenated, either prior to or after the amination, to saturate or partially saturate the polymers. Polyureas, polyurethanes, crosslinked epoxies, polyamides, and other derivatives with improved properties can be prepared from the ATPBs. The resultant derivatives are useful in liquid binders for braking systems, electric potting compositions, coatings, adhesives, sealants, and water proofing membranes, for example.

7 Claims, No Drawings

AMINO-TERMINATED POLYBUTADIENES

BACKGROUND OF THE INVENTION

The invention relates to the preparation and use of amino-terminated polybutadienes.

Hydroxyl-terminated polybutadiene (HTPB) and hydrogenated HTPB have been commercially used in applications demanding low temperature flexibility, water resistance, hydrolytic, acid, or base stability, and/or low dielectric constant, for example in adhesives, sealants, coatings, and electrical potting insulation. However, a deficiency of using HTPB and hydrogenated HTPB is often caused by the rather weak nucleophilicity of the hydroxyl group at the chain end, which prevents its incorporation into formulations under commonly used process conditions. For example, the hydroxyl groups are usually not sufficiently reactive with bisphenol A (BPA) epoxy resins to be useful as crosslinkers or flexibilizers. In addition, when preparing electric potting compounds, the reaction rate between the anhydride of maleic anhydride (MA)-modified polybutadiene and the hydroxyl group of HTPB is too slow at room temperature. Also, the curing reaction between the hydroxyl group of HTPB and isocyanate groups in certain polyurethane applications is hindered, or is rendered incomplete, by the presence or other hydroxyl-containing additives which react at a comparable or faster rate.

Since amine groups have higher nucleophilic reactivity, the amine-terminated polybutadiene (ATPB) polymers corresponding to the HTPB polymers would have been preferable, except for the difficulty and expense of prior art methods of preparing ATPB.

Prior methods of preparing amino-terminated hydrogenated polybutadiene polymers (ATPB) have included synthesis from functionalized initiators and butadiene monomer or by converting hydroxyl-terminated polybutadiene (HTPB) to ATPB by multi-step synthetic pathways.

Lintsell, et al., *Synthesis and characterization of α, ω- and α-functionalized hydrogenated polybutadienes: telechelic and semi-telechelic amine and phosophite terminated polymers*, Polymer, Vol. 38, Number 11, 2835 (1997) disclosed tosylation of primary HTPBs followed by reaction with aniline or n-propylamine or 3-(dimethylamino)-propyl amine. The terminally tosylated HTPBs were reacted with sodium azide in solvent and then hydrogenated to form the α, ω-diamino polymer (ATPB).

Similarly, Hinney et al., U.S. Pat. No. 4,658,062 assigned to Atlantic Richfield Company, disclosed converting liquid primary HTPB polymer such as Poly bd R45-HT brand to produce ATPB via alkane- or arenesulfonate-terminated polybutadiene. Such methods as that of Lintsell, et al., and Hinney, et al. are interesting from an academic standpoint but are too expensive and cumbersome for commercial use.

Yeakey, et al., U.S. Pat. No. 4,994,621 assigned to Texaco Chemical Company, disclosed reacting liquid HTPB polymer such as Poly bd R45-HT brand wherein the hydroxyl groups are primary, with several oxirane units per hydroxyl group, to produce a secondary hydroxyl-terminated polymer containing ether linkages. The resultant polymers were aminated by reacting ammonia with the hydroxyl groups under reducing conditions provided by hydrogen under pressure to produce a polymer which was essentially primary amine-terminated. The resultant ATPB of Yeakey, et al., was used in the preparation of polyurea foam or polyurea elastomer and to prepare more hydrophobic cured epoxy resin formulations than could be prepared with previous polyamines.

However, such prior art ATPBs suffered from one or more disadvantages. For example, such prior ATPBs containing ether groups were not weatherable and the resultant polyureas, epoxies, and other resins prepared therefrom were also not weatherable in many cases.

In a copending patent application, application Ser. No. 10/300,435 filed Nov. 19, 2002, we disclosed a method of preparing amine-terminated polybutadiene polymers having one or two terminal amine groups comprising aminating a secondary hydroxyl-terminated polybutadiene having no ether groups. In some situations, an alternative method of preparation may be desirable.

Reinking, U.S. Pat. No. 3,316,185, discloses liquid glycol diamines used as curing agents for polyepoxide compositions prepared by cyanoalkylating a glycol of the general formula HO—$(C_nH_{2n}O)_x$H wherein n has a value of 2 to 5 and x has a value of 1 to 11. Hydroxyl terminated polybutadiene is not disclosed or suggested by Reinking as a suitable substance (HTPB is not a glycol) to be aminated.

It is an object of the present invention to provide ATPBs which enable improved weatherability when reacted with polyisocyanates, epoxides, anhydride functional polymers, phenolics, or multifunctional carboxylic acid or ester derivatives.

It is another object of the invention to provide ATPBs which can be used as flexibilizers, tougheners, or crosslinkers to produce cured resins with improved physical properties versus the prior ATPBs.

SUMMARY OF THE INVENTION

These objects, and others which will become apparent from the following disclosure, are achieved by the present invention which comprises in one aspect a method of preparing amine-terminated polybutadiene polymers having one or two terminal amine groups comprising aminating a hydroxyl-terminated polybutadiene by cyanoethylation followed by reduction. The cyanoethylation is carried out by a Michael addition of acrylonitrile to the terminal hydroxyl groups to form terminal cyano groups, followed by reduction with hydrogen to form terminal amine groups on the polybutadiene.

In another aspect, the invention comprises the novel amine-terminated polybutadiene polymers having one or two terminal amine groups prepared by the novel method.

The amine-terminated polybutadiene polymers having one or two terminal amine groups can be hydrogenated or partially hydrogenated, either before or after amination, if desired.

A further aspect is a method of imparting improved physical properties to epoxies, anhydride-functionalized polymers, phenolics, multifunctional carboxylic acid or ester derivatives, and the like to flexibilize, crosslink, and/or toughen the resulting polymers by curing the epoxies, anhydride-functionalized polymers, phenolics, or multifunctional carboxylic acid or ester derivatives with the novel ATPBs and/or hydrogenated ATPBs of the invention.

The resulting polymeric compositions and polymers, i.e., polyureas, polyamides, polyamic acids, polyimides, polyurethanes and reaction products with epoxies, phenolics, and anhydrides, are also an aspect of the invention. Such cured polymer products are characterized by exceptional flexibility and toughness. Moreover, the polymers produced with the novel amine-terminated polybutadiene polymers having one or two terminal amine groups possess excellent water resistance and superior, low dielectric properties.

DETAILED DESCRIPTION OF THE INVENTION

The Michael addition of acrylonitrile (cyanoethylation) to the alcohol to form the corresponding cyanoalkylated compound is often catalyzed by a base. Suitable bases include, for example, alkali metal alkoxide such as sodium methoxide.

The subsequent hydrogenation (reduction) of the nitrile is generally catalyzed by Group VIII metals or metal-containing complexes. Suitable Group VIII metals include nickel.

The addition of the first mole of hydrogen gives an imine. The reaction of this imine with another amine leads to the formation of secondary amines and dimers. As in reductive amination, an the addition of an excess of ammonia during the hydrogentation minimizes this side reaction. Another potential complication reaction under the conditions needed for nitrile reduction is the reverse Michael, which can result not only in alcohols, but the acrylonitrile can then add to newly formed amines leading to a complicated mix of terminal functionality.

Hydroxyl-terminated polybutadienes can be prepared from either radical polymerization of butadiene in the presence of hydrogen peroxide or anionic polymerization of butadiene, followed by termination with alkylene oxides.

Saturated, i.e., hydrogenated, or partially saturated ATPBs of the invention can be prepared by known hydrogenation methods. The partial or complete hydrogenation of the butadiene backbone can be carried out either before the amination of HTPB step or after the amination step.

The ATPBs of the invention can be reacted with phosgene, diisocyanates or polyisocyanates, or urea to form polyureas. The difunctional ATPBs can also be used as a chain extender during the preparation of water-dispersible polyurethanes. Among other uses the monofunctional ATPBs can be used as chain blocking agents or as grafting agents for modifying oligomers or polymers bearing end- or side-groups, like carboxyls or anhydrides or isocyanates, which can react with amine groups of ATPBs of the invention. Specific bloc or grafted or star type controlled polymeric structures can be obtained by using these ATPBs.

ATPB reacts with epoxies, such as bisphenol A epoxy resins or cylcoaliphatic diepoxides, to form covalent bonds with the epoxy matrix. In such systems the ATPB not only serves as a catalyst, but also a chain flexibilizer in the crosslinked epoxy materials.

The ATPBs react with dicarboxylic acids or derivatives, such as esters and acid chlorides, to form polyamides which reduce the crystallinity and water-absorption of nylons and improve impact resistance of nylons. The polyamide copolymers can be prepared by reacting the ATPB with Nylon or polyesters.

ATPB reacts with dianhydrides to form polyamic acids or polyimides after dehydration. The ATPBs improve the reaction rate of preparing electric potting compounds with MA-modified polybutadiene and the impact resistance of high-temperature polyimides.

ATPB can condense with phenolic compounds via a Mannich-type reaction to serve as a flexibilizer and enhance the electric properties of the resulting phenolic resins.

ATPB can be used as the sole diamine, or in combination with other di- or polyamines in the aforementioned reactions and condensations.

The applications of the materials derived from ATPB include, but are not limited to water-proofing membranes or coatings in the construction industry, adhesives and sealants for housing, road paving, bridges, electronic, automotive, marine and aeronautical applications, electric potting, and liquid binders in brake systems.

Hydrogenated or partially hydrogenated ATPB can be used in the same reactions where ATPB is used. Hydrogenated ATPB in general should render better thermo-oxidative and UV stability to the materials derived therefrom. Applications based on hydrogenated ATPB comprise, but are not limited to, automotive clear/base coats, roof deck coatings, and cable insulation, in addition to the uses described for ATPB.

EXAMPLES

The following examples illustrate a few embodiments of the invention.

Example 1

Preparation of Amine-Terminated Polybutadienes From Hydroxyl-Terminated Polybutadienes This example illustrates the preparation of ATPBs by cyanoalkylation, of HTPBs, followed by reduction.

Into a 1 liter, 3-necked round-bottomed flask equipped with a thermometer, dropping funnel, reflux condenser, and an overhead stirred was placed Krasol LBH 2000 (200 g), cyclohexane (200 g) and anhydrous sodium hydroxide (1 g). The solution was warmed to 50° C. and then with stirring acrylonitrile was added dropwise over 90 min. while maintaining the temperature between 50 and 60° C. Following addition of the acrylonitrile (12.73 g, 0.24 mole), the reaction mixture was stirred an additional 90 min. at 50° C. and then cooled and transferred to a rotary evaporator to remove the solvent and unreacted acrylonitrile. The cyanoalkylated compound was redissolved in cyclohexane and then hydrogenated in a autoclave at a temperature in the range of from about 95° C. to about 100° C. in the presence of Raney nickel or cobalt catalyst and anhydrous ammonia at pressures on the order of about 1500 p.s.i.g. The reaction mixture was washed several times with water, and then was concentrated to form ATPB.

Various other embodiments, alternatives, and modifications should be readily apparent to those skilled in this art without departing from the spirit and scope of the invention.

What is claimed is:

1. A method of preparing amine-terminated polybutadiene polymers having one or two terminal amine groups comprising aminating a hydroxyl-terminated polybutadiene by first reacting acrylonitrile to form a terminal nitrile group and then reducing the nitrile groups with hydrogen to form the terminal amine.

2. The method of claim 1 wherein the first reaction with acrylonitrile is catalyzed with a base.

3. The method of claim 2 wherein the base is selected from the group consisting of lithium hydroxide, sodium hydroxide and potassium hydroxide.

4. The method of claim 1 wherein the reduction with hydrogen is carried out in the presence of one or more Group VIII metal.

5. The method of claim 4 wherein the Group VIII metal is selected from the group consisting of nickel, palladium, platinum, ruthenium, rhodium and cobalt.

6. The method of claim 1 wherein the reduction with hydrogen is carried out in the presence of ammonia.

7. The method of claim 1, further including hydrogenation or partial hydrogenation of the polybutadiene either prior to amination or after amination.

* * * * *